(12) United States Patent
Lewis et al.

(10) Patent No.: US 8,403,069 B2
(45) Date of Patent: Mar. 26, 2013

(54) OIL RECOVERY EMPLOYING ALKYLENE CARBONATES

(75) Inventors: David C. Lewis, Conroe, TX (US); Luis C. Salazar, Spring, TX (US); James R. Machac, Jr., The Woodlands, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 370 days.

(21) Appl. No.: 12/863,575

(22) PCT Filed: Jan. 15, 2009

(86) PCT No.: PCT/US2009/031074
§ 371 (c)(1),
(2), (4) Date: Jul. 19, 2010

(87) PCT Pub. No.: WO2009/094285
PCT Pub. Date: Jul. 30, 2009

(65) Prior Publication Data
US 2010/0294499 A1      Nov. 25, 2010

Related U.S. Application Data

(60) Provisional application No. 61/022,707, filed on Jan. 22, 2008.

(51) Int. Cl.
*E21B 43/16* (2006.01)
*E21B 43/22* (2006.01)
*E21B 43/24* (2006.01)

(52) U.S. Cl. .......... 166/403; 166/272.3; 166/300; 166/305.1; 166/371

(58) Field of Classification Search .......... None
See application file for complete search history.

(56) References Cited

U.S. PATENT DOCUMENTS

| | | |
|---|---|---|
| 4,159,943 A | 7/1979 | Petrovich |
| 4,519,454 A | 5/1985 | McMillen |
| 4,531,586 A | 7/1985 | McMillen |
| 4,548,721 A | 10/1985 | DeBons |
| 4,828,032 A | 5/1989 | Teletzke et al. |
| 5,492,177 A * | 2/1996 | Yeh et al. .......... 166/295 |
| 5,725,054 A | 3/1998 | Shayegi et al. |
| 2005/0250927 A1 | 11/2005 | Pritschins et al. |
| 2007/0107897 A1 | 5/2007 | Dahanayake et al. |

OTHER PUBLICATIONS

M. Dos Anjos De Sousa, et al. "The onset of precipitation of asphaltenes in solvents of different solubility parameters", *Progr. Colloid Polym Sci.* (2004) 128:283-287.
Chia-Lu Chang, et al. "Asphaltene stabilization in alkyl solvents using oil-soluble amphiphiles" Society of Petroleum Engineers SPE 25185; SPE International Symposium on Oilfield Chemistry held in New Orelans, LA USA Mar. 2-5, 1993.
Luis Carlos Rocha, Jr., et al. "Inhibition of asphaltene precipitation in Brazilian crude oils using new oil soluble amphiphiles", *Journal of Petroleum Science and Engineering* 51 (2006) 26-36.
F. M. Orr, Jr., et al. "CO2 as solvent for oil recovery" Chemtech pp. 482-487, Aug. 1983.
J. W. Hills, et al. "Carbon dioxide supercritical fluid extraction with a reactive solvent modifier for the determination of polycyclic aromatic hydrocarbons", Journal of Chromatographic Science, vol. 31, pp. 6-12, Jan. 1993.
Steven H. Page, et al. "Predictability and effect of phase behavior of CO2/propylene carbonate in supercritical fluid chromatography", *J. Microcol.* Sep. 3, 355-369 (1991).
A. Settari, et al. "Simulation of enhanced recovery projects—the problems and the pitfalls of the current solutions", *Journal of Canadium Petroleum Technology*, pp. 22-28, Nov.-Dec. 1985.

* cited by examiner

*Primary Examiner* — Zakiya W Bates
(74) *Attorney, Agent, or Firm* — Huntsman International LLC

(57) ABSTRACT

A method for enhanced oil recovery contacts a gas and an alkylene carbonate with a subterranean formation. The gas may be selected from any gas that is suitable for injection into a subterranean formation and has properties that allow for enhanced recovery of petroleum from a subterranean formation. The alkylene carbonate may be cyclic, straight chained, or combinations thereof.

18 Claims, No Drawings

OIL RECOVERY EMPLOYING ALKYLENE CARBONATES

CROSS-REFERENCE TO RELATED APPLICATIONS

This application is the National Phase of International Application PCT/US2009/031074 filed Jan. 15, 2009 which designated the U.S. and which claims priority to U.S. Provisional App. Ser. No. 61/022,707 filed Jan. 22, 2008. The noted applications are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to methods of oil recovery and more particularly to the use of alkylene carbonates in combination with a gas in methods that improve oil recovery from subterranean formations.

2. Background of the Invention

As the demand for fossil fuels and the market price of crude oil both increase there is a corresponding desire to produce more oil from maturing reservoirs. These efforts are referred to as Enhanced Oil Recovery (EOR) or Improved Oil Recovery (IOR). One form of EOR is the introduction of carbon dioxide at high pressures into a reservoir via injection wells. This form of EOR may increase production by elevating the reservoir pressure and by increasing the mobility of the oil through the reservoir. It is believed that carbon dioxide behaves like a solvent that swells the crude oil and decreases its viscosity.

However, crude oil is a complex mixture that contains low molecular weight, non-polar light ends and colloidal type dispersions of asphaltenes and other heavy polar materials. Only the light components of the crude oil typically interact favorably with carbon dioxide. As the light ends are removed by the carbon dioxide, the colloidal heavies typically become unstable and precipitate onto the formation. This precipitation becomes problematic as the precipitates may clog the pores and channels such that even the lighter hydrocarbons become trapped and unrecoverable from a reservoir.

Carbon dioxide has been injected into petroleum reservoirs in combination with surfactants such that foams are produced. These foams may improve the removal of asphaltenes and other heavy polar materials. However, the surfactants can be expensive, may adsorb onto the formation, and may increase the difficulty of separating the oil from water at the production well. The surfactants also are not believed to enhance the mobility of the oil by swelling it and making it less viscous.

Co-solvents have been proposed for use with carbon dioxide for enhanced oil recovery. Gases such as methane and butane will improve the oil properties, but because of their low polarity they mostly affect the light ends. Xylene has been used to remove asphaltenes from well bores. In the field, the use of aromatic solvents is not practical due to cost, safety and environmental issues. For example, toluene is a great solvent for the heavies found in crude oil but it is very volatile and has a low flash point and would require explosion proof equipment and special precautions for handling. Also toluene and similar aromatic solvents are not considered "green" and not likely to be used because of negative environmental effects.

BRIEF SUMMARY OF SOME OF THE PREFERRED EMBODIMENTS

Therefore, it is desirable to have novel EOR method that helps to recover the light and heavy components of crude oil.

In one embodiment of the present invention, an enhanced oil recovery method is disclosed that includes the steps of providing at least one gas suitable for injection into a subterranean formation and at least one alkylene carbonate. The gas and alkylene carbonate are then contacted with a subterranean formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other methods for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

In one embodiment of the present invention, an enhanced oil recovery method is disclosed that comprises the steps of providing at least one gas suitable for injection into a subterranean formation, providing at least one alkylene carbonate, and contacting the subterranean formation with the at least one gas and the at least one alkylene carbonate.

The at least one gas may be selected from any gas that is suitable for injection into a subterranean formation. Ideally, the gas has properties that allow for enhanced recovery of petroleum from a subterranean formation. It is typically desirable that a gas be able to achieve a miscible flood in the subterranean formation. In embodiments of the present invention, the gas may be methane, ethane, propane, butane, nitrogen, carbon dioxide, or combinations thereof.

In one embodiment of the present invention, the gas is carbon dioxide. The carbon dioxide may be in any state including solid, liquid, a supercritical fluid, or gas. At low temperatures and standard pressures carbon dioxide is a solid (dry ice); at low temperatures and high pressures carbon dioxide is a liquid (this is how it is typically transported); at high temperature and high pressures carbon dioxide is a supercritical fluid; and at standard temperature and pressure carbon dioxide is a gas.

In an embodiment of the present invention, the carbon dioxide is in a supercritical state. Carbon dioxide exists in its supercritical state above its critical point which is $Pc=72.8$ bar and $Tc=31.1°$ C.

In other embodiments of the present invention, the carbon dioxide may be foamed. Carbon dioxide foam is typically created by the addition of carbon dioxide, a surfactant and a solvent.

Carbon dioxide suitable for use in embodiments of the present invention can be sourced from a variety of suppliers delivered through normal means like truck and pipeline. New sources of carbon dioxide are being developed driven by the need to limit emissions into the atmosphere. These sources can be utilities, fermentation plants, and any facility where carbon dioxide emissions are being captured. One skilled in the art, with the benefit of this disclosure will recognize appropriate gases for use in embodiments of the present invention.

The embodiments of the present invention also provide for at least one alkylene carbonate. The alkylene carbonates may be cyclic, straight chained, or combinations thereof. One family of alkylene carbonates that is considered "green" and may be used in embodiments of this present invention are the five-membered cyclic alkylene carbonates (1,3-dioxolan-2-ones).

In embodiments of the present invention, the alkylene carbonates may include ethylene carbonates (EC), propylene carbonates (PC), butylene carbonates (BC) and combinations thereof. Of the three, PC may be preferred because it is non-toxic, unlike EC, and non-hazardous and less expensive to manufacture than BC. However, if the components in the petroleum to be recovered respond better to EC or BC, these alkylene carbonates may be preferred to PC. Table 1 gives the physical properties of these solvents. The high boiling points and flash points make them typically safer to handle than many other solvents or gases.

TABLE 1

Properties of Ethylene, Propylene, and Butylene Carbonate

| Property | EC | PC | BC |
|---|---|---|---|
| boiling point (° C.) | 248 | 242 | 251 |
| freezing point/melting point (° C.) | 36.4 | −49 | <−45 |
| flash point (° C.) | 160 | 135 | 135 |
| viscosity (cP @ 25° C.) | 2.56[a] | 2.5 | 3.15 |
| % VOC[b] (110° C.) | 34 | 28 | 18.4 |

[a]Supercooled liquid.
[b]Volatile organic content.

Examples of combinations of PC and BC, as well as other carbonates can be found in Table 2. Structures below including an alkyl group R include without limitation, all $C_1$ to $C_{25}$ alkyl groups.

TABLE 2

Examples of alkylene carbonates and combinations thereof

1% BC/99% PC by weight
10% BC/90% PC by weight
30% BC/70% PC by weight
50% BC/50% PC by weight
70% BC/30% PC by weight
90% BC/10% PC by weight
2,3-butylene carbonate
1,2 dodecyl carbonate
1,2 tetradecyl carbonate
1,2 hexadecyl carbonate
1,2 octadecyl carbonate
Didodecyl carbonate

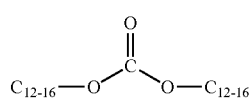

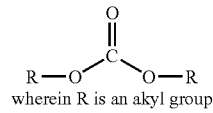
wherein R is an akyl group

TABLE 2-continued

Examples of alkylene carbonates and combinations thereof

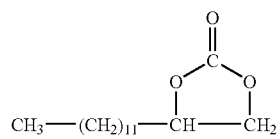

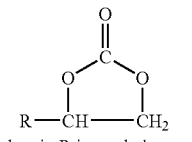
wherein R is an akyl group $C_{12-14}$ alkyl glycidyl ether carbonate
Combinations of the above carbonates In another embodiment, the alkylene carbonate used in the present invention may be produced on-site using carbon dioxide present at the site, for example carbon dioxide that has been piped in or transported to the site. Alkylene carbonates have the advantage of being a form of chemical carbon dioxide sequestration.

The use of alkylene carbonates may have additional benefits in the subterranean formation. First, a portion of the alkylene carbonate may remain in the crude oil when the carbon dioxide breaks through to the production well. This portion may help reduce the viscosity of the crude oil. Second, the alkylene carbonates may assist with EOR as they degrade in a subterranean formation. For example, PC degrades into carbon dioxide and 1,2-propylene glycol. The released carbon dioxide would have the beneficial effect of contributing to the carbon dioxide level in the subterranean formation. The 1,2-propylene glycol is believed to have the beneficial effect of altering the surface properties (e.g.— wettability) of the oil such that recovery is improved. Propylene glycol is also considered a "green" bi-product that is not believed to have a damaging environmental effect on the subterranean formation. One skilled in the art, with the benefit of this disclosure, will recognize appropriate alkylene carbonates that can be used in embodiments of the present invention.

In embodiments of the present invention, the gas and alkylene carbonate are contacted with a subterranean formation. The processes of introducing the alkylene carbonate and the gas into the subterranean formation are well known in the art. For example, introducing the alkylene carbonate and the gas may be done by pre-injection, simultaneous injection, or post injection. Ideally, before injection, the characteristics of the subterranean formation are understood and steps have been taken to shut-off unproductive zone and to optimize injection/production well patterns.

In one embodiment, the alkylene carbonate and gas are combined before injection into the subterranean formation. Therefore the subterranean formation is exposed to the alkylene carbonate and gas concurrently. This may be referred to as simultaneous injection. If an entire field is being treated, the alkylene carbonate can be introduced to the main gas pipeline before it separates out to go to the individual injection wells. If a trial is being performed, then the alkylene carbonate can be introduced to gas close to the injection point. In many cases, high pressure pumps may be needed to get the alkylene carbonate into the gas stream that may have pressures of 1200 psi or higher.

In another embodiment, the subterranean formation is first pre-treated with the alkylene carbonate, and then it is treated with the gas. This embodiment, as well as other embodiments of the present invention, may be beneficial in subterranean formations that have been damaged by improper application of carbon dioxide or other EOR techniques that led to the precipitation of "heavies" from the crude.

Once the alkylene carbonate and gas have been contacted with the subterranean formation, the petroleum products can then be recovered using methods known in the art. In some embodiments, the subterranean formations may require a "soak time" while others formations might be immediately responsive.

The present invention covers all ratios in the mixture of alkylene carbonate with a gas. Traditionally in extraction methods the amount of chemical used is from 1% to 5% v/v to the gas. Other However, the much broader range of "all ratios" is specified in this invention because the characteristics of petroleum will vary from reservoir to reservoir. In practice the upper limit of how much alkylene carbonate is utilized will be determined by the characteristics of the oil in place and the degree of economic desire to recover the oil.

In the case of using PC as the alkylene carbonate and carbon dioxide as the gas, it typically does not take very much PC to alter the properties of supercritical carbon dioxide. This is important because large amounts of PC may increase both the temperature and pressure needed for carbon dioxide to remain in its supercritical state. One skilled in the art will recognize appropriate adjustments in temperature and pressure to keep the carbon dioxide in a supercritical state.

Combining a certain amount of alkylene carbonate with a gas, such as a supercritical carbon dioxide, may improve the EOR properties (e.g. solubility, polarity, etc. . . . ) of the alkylene carbonate and/or gas so that recovery of petroleum from a subterranean formation is enhanced. For example, the combination of alkylene carbonate and supercritical carbon dioxide may help stabilize asphaltenes in their sensitive colloidal structure so the asphaltenes don't precipitate in the subterranean formation. Therefore, the combination of alkylene carbonate and supercritical carbon dioxide may allow the use of supercritical carbon dioxide enhanced oil recovery to take place in reservoirs that previously were not considered for this type of effort due to concerns that the asphaltenes would precipitate and irreversibly damage the formation.

Embodiments of the present invention may also have at least one additional chemical. Additional chemicals may include solvents, surfactants, wetting agents, polymers, acids, and/or bases, combinations thereof and other substances used in EOR techniques. In one embodiment, the solvent is an oleophilic solvent. The oleophilic solvents may include xylenes, toluenes, heptanes, and combinations thereof. In an embodiment, these chemicals are also contacted with the subterranean formation. One skilled in the art, with the benefit of this disclosure, will recognize appropriate additional chemicals to use in embodiments of the present invention.

Embodiments of the present invention also teach the use of other tertiary EOR systems in combination with the systems taught herein. The tertiary enhanced oil recovery system may include water-oil-gas systems, WAG (water-alternate-gas), huff-n-puff, surfactant-alternate-gas, single well cyclic carbon dioxide injections, continuous carbon dioxide floodings, cyclic steam stimulations, steam floodings, carbon dioxide foam systems, thermal stimulations and combinations thereof. One skilled in the art, with the benefit of this disclosure will recognize appropriate secondary EOR systems to be used in embodiments of the present invention.

Although the present invention and its advantages have been described in detail, it should be understood that various changes, substitutions and alterations may be made herein without departing from the spirit and scope of the invention as defined by the appended claims.

What is claimed is:

1. An enhanced oil recovery method comprising:
contacting a subterranean formation with at least one gas suitable for injection into the subterranean formation and at least one alkylene carbonate, wherein the contacting comprises treating the subterranean formation with a mixture of at least one gas and at least one alkylene carbonate concurrently.

2. The method of claim 1 wherein the at least one gas suitable for injection into a subterranean formation comprises carbon dioxide.

3. The method of claim 2 wherein the carbon dioxide is in a supercritical state.

4. The method of claim 1 wherein the at least one gas suitable for injection into a subterranean formation is selected from the group consisting of: methane, ethane, propane, butane, nitrogen and combinations thereof.

5. The method of claim 1 wherein the at least one alkylene carbonate comprises a cyclic alkylene carbonate.

6. The method of claim 1 wherein the at least one alkylene carbonate comprises a straight chained alkylene carbonate.

7. The method of claim 1 wherein the at least one alkylene carbonate comprises a propylene carbonate.

8. The method of claim 7, wherein the at least one alkylene carbonate further comprises a butylene carbonate.

9. The method of claim 1 wherein the at least one alkylene carbonate is selected from the group consisting of: an ethylene carbonate, a butylene carbonate and a combination thereof.

10. The method of claim 1 wherein the at least one alkylene carbonate is selected from the group consisting of: 1,2 dodecyl carbonate, 1,2 tetradecyl carbonate, 1,2 hexadecyl carbonate, 1,2 octadecyl carbonate and a combination thereof.

11. The method of claim 1 wherein the at least one alkylene carbonate comprises a $C_{12-14}$ alkyl glycidyl ether carbonate.

12. The method of claim 1 wherein the at least one alkylene carbonate comprises the formula:

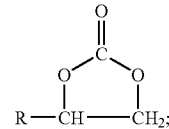

wherein R is an alkyl group.

13. The method of claim 1 further comprising:
contacting at least one additional chemical with the subterranean formation.

14. The method of claim 13 wherein the at least one additional chemical is selected from the group consisting of: a solvent, a surfactant, a wetting agent and combinations thereof.

15. The method of claim 14 wherein the solvent is an oleophilic solvent.

16. The method of claim 13 further comprising the step of employing a tertiary enhanced oil recovery system.

17. The method of claim 16 wherein the tertiary enhanced oil recovery system is selected from the group consisting of:

a water-oil-gas system, a cyclic steam stimulation, a steam flooding, a foam system, a thermal stimulation and combinations thereof.

18. Oil recovered by the method of claim 1.

* * * * *